(No Model.) 2 Sheets—Sheet 1.

W. W. TREVOR.
MACHINE FOR TURNING BARREL HEADS.

No. 531,400. Patented Dec. 25, 1894.

Witnesses:
Theo. L. Popp
John N. Ardner

Wm. W. Trevor,
Inventor.
By Wilhelm Bonner
Attorneys.

(No Model.) 2 Sheets—Sheet 2.
W. W. TREVOR.
MACHINE FOR TURNING BARREL HEADS.
No. 531,400. Patented Dec. 25, 1894.
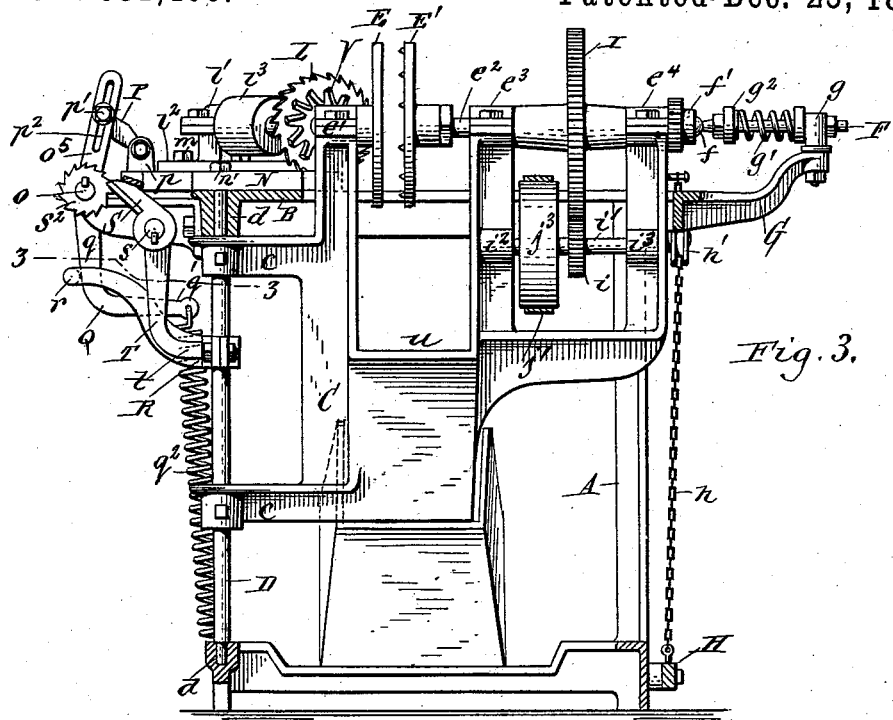
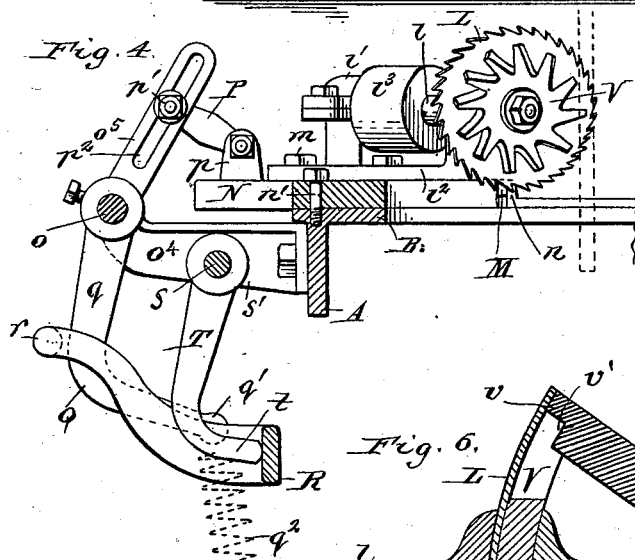
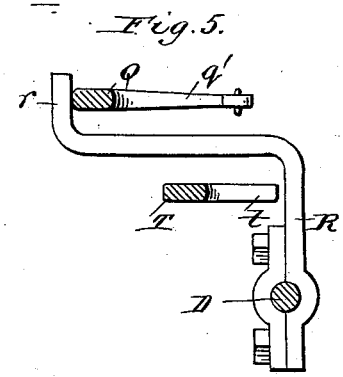
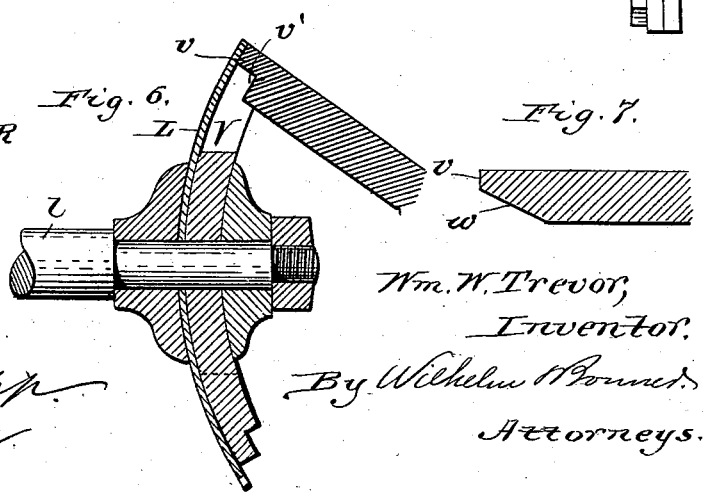

UNITED STATES PATENT OFFICE.

WILLIAM W. TREVOR, OF LOCKPORT, NEW YORK.

MACHINE FOR TURNING BARREL-HEADS.

SPECIFICATION forming part of Letters Patent No. 531,400, dated December 25, 1894.

Application filed November 23, 1891. Serial No. 412,754. (No model.)

*To all whom it may concern:*

Be it known that I, WILLIAM W. TREVOR, a citizen of the United States, residing at Lockport, in the county of Niagara and State of New York, have invented new and useful Improvements in Machines for Turning Barrel-Heads, of which the following is a specification.

This invention relates to a machine which is employed for turning heads for barrels, tubs, &c., and in which the heading is presented by a revolving clamp to a concave circular saw. A machine of this character is shown and described in United States Letters Patent No. 166,041, granted to me July 27, 1875, and the present invention is an improvement upon the same.

The object of my invention is provide means whereby the saw is carried quickly across the path of the heading blank so that the latter requires only one revolution in cutting the same.

Figure 1:
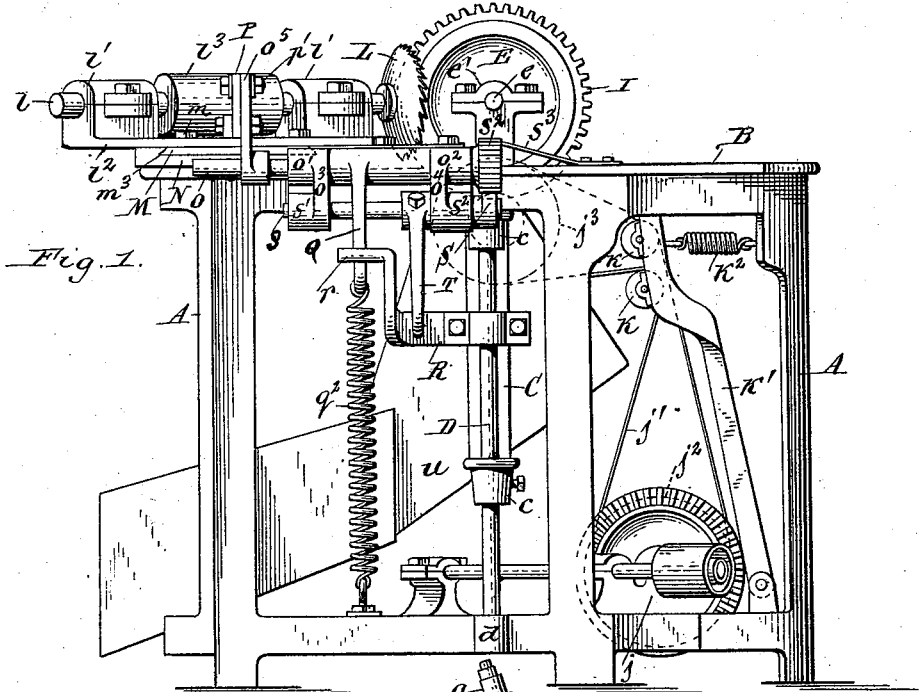
Figure 2:
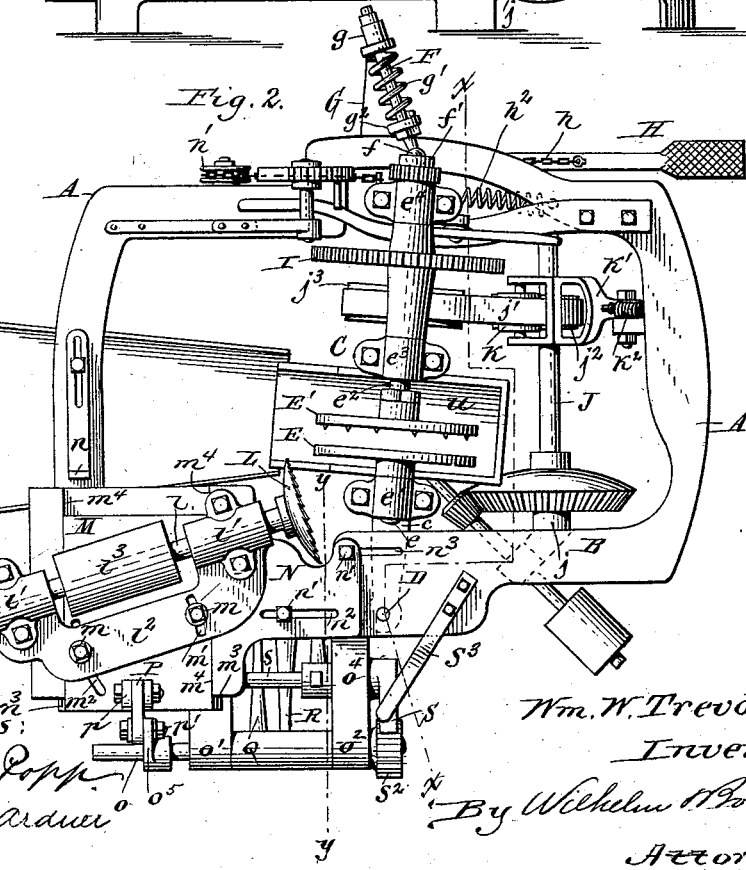

In the accompanying drawings consisting of two sheets:—Figure 1 is a side elevation of my improved machine. Fig. 2 is a top plan view thereof. Fig. 3 is a vertical section thereof in line $x$—$x$, Fig. 2, showing the parts in their normal retracted positions. Fig. 4 is a fragmentary vertical section, on an enlarged scale, in line $y$—$y$, Fig. 2, showing the saw and its support moved forward. Fig. 5 is a horizontal section in line $z$—$z$, Fig. 3. Fig. 6 is a fragmentary horizontal section of the saw and its arbor, showing the means for cutting a square rabbet on the heading. Fig. 7 is a fragmentary section, showing a partly beveled edge on the heading.

Like letters of reference refer to like parts in the several figures.

A represents the main frame provided with an open top plate or table B.

C represents a horizontally swinging clamp frame arranged transversely inside of the main frame and carrying the devices for clamping and revolving the heading. This swinging clamp frame is provided on its front side with two horizontal arms $c$ $c$ which are secured to a vertical rock shaft D journaled in bearings $d$ $d$ in the main frame.

E E′ represent the revolving clamping disks whereby the heading is held while being turned. These clamping disks are arranged vertically above the table. The front disk E has no longitudinal movement and is supported on the rear end of a short horizontal shaft $e$ journaled in a bearing $e′$ formed on the upper portion of the clamp frame. The rear or clamping disk E′ faces the front disk and is secured to the front end of a horizontal shaft $e^2$ journaled in bearings $e^3$ $e^4$ formed on the rear portion of the clamp frame. The shaft of the movable clamping disk is axially in line with the shaft of the stationary clamping disk and is capable of moving lengthwise in its bearings, so as to permit the movable disk to approach and recede from the stationary clamping disk in clamping or releasing the heading.

F represents a toggle bar whereby the movable clamping disk is moved toward and from the stationary clamping disk when the carrier frame is oscillated. This toggle bar is arranged horizontally and is provided at its inner end with a spherical knuckle $f$ which rests in a correspondingly shaped socket formed in a collar $f′$ secured to the rear end of the shaft of the movable clamping disk. The outer end of the toggle bar passes loosely through an opening in an upright post $g$ which latter is pivoted to the outer end of a bracket G secured to the rear side of the main frame.

$g′$ represents a spring surrounding the toggle bar and bearing against the post $g$ and a collar $g^2$. In the normal or backward position of the parts, the shafts of the clamping disks and the toggle bar are axially out of line and form an elbow, as represented in Fig. 2. When the clamp frame is moved forward so that the clamping disks and toggle bar are brought into alignment, the latter forces the movable clamping disk toward the stationary clamping disk, thereby clamping the heading between the disks.

H represents the treadle whereby the carrier frame is moved forward and which is pivoted to the main frame and connected with the carrier frame by a chain $h$ which passes over a pulley $h′$.

$h^2$ represents a spring secured to the carrier frame and the main frame, whereby the latter is returned to its normal position after having been moved forward by the treadle.

I represents a gear wheel mounted on the shaft of the movable clamping disk and keyed thereto so as to turn with this shaft, but held against lengthwise movement therewith by the bearings $e^3 e^4$. $i$ represents a pinion meshing with the gear wheel I and mounted on a counter shaft $i'$ journaled in bearings $i^2 i^3$ arranged on the carrier frame below the bearings $e^3 e^4$.

J represents a transverse driving shaft journaled in bearings $j$ arranged in the lower portion of the main frame. Motion is transmitted from this driving shaft to the counter shaft $i'$ and the clamping disks by means of a driving belt $j'$ passing around pulleys $j^2 j^3$ mounted respectively on the driving shaft and the counter shaft. The intermediate portions of the belt $j'$ pass around tightening pulleys K journaled in the upper part of the tightner frame K'. The latter is pivoted at its lower end to the main frame and its upper end is yieldingly connected with the main frame by means of a spring $K^2$. This spring places a tension upon the belt $j'$, whereby the latter is tightened when the carrier frame is moved forward, thereby automatically setting the clamping disks in motion, and stopping the rotation of the disks upon moving the carrier frame backward. These devices for clamping the heading and revolving the same are substantially like the mechanism shown and described in the Letters Patent heretofore referred to.

L represents the concave circular saw whereby the heading is turned into circular form upon revolving the heading against the saw. This saw is arranged vertically with its concave side toward the axis of the clamping disks and is mounted on the inner end of a horizontal arbor $l$. The latter is journaled in bearings $l' l'$ formed on a horizontal connecting plate $l^2$. Motion is transmitted to the saw from any suitable source by a belt passing around a pulley $l^3$ mounted upon the arbor.

M represents a sliding plate or carriage which carries the saw toward and from the revolving heading. The plate $l^2$ connecting the bearings of the saw arbor is arranged upon this sliding plate and is secured thereto by bolts $m$ passing through curved slots $m' m^2$ formed in the plates, whereby the angle of the saw, with reference to the heading, can be adjusted to suit different sizes of work. The sliding plate rests on a supporting plate N and is provided with dove-tail sides $m^3$ which are arranged in dove-tail grooves $m^4$ formed in the upper side of the supporting plate, whereby the sliding plate is guided in its reciprocating movement.

The dove-tail guides of the sliding plate are so arranged that the saw has a reciprocating movement parallel with the axis of the revolving heading clamp when the heading is in position to be cut or turned.

$n$ represents an adjustable stop secured to the table and against which the rear side of the sliding plate is adapted to strike, thereby limiting the inward movement of the saw.

The supporting plate N rests upon the front part of the table and is capable of lengthwise adjustment thereon by bolts $n'$ passing through slots $n^2 n^3$ formed respectively in the supporting plate and table, whereby the saw can be adjusted toward and from the axis of the clamping disks for the purpose of turning heading of various diameters.

O represents a horizontal rock shaft whereby the sliding plate supporting the saw is actuated. This rock shaft is arranged along the front side of the machine and is journaled in bearings $o' o^2$ formed at the outer ends of brackets $o^3 o^4$ secured to the front part of the main frame. One end of this rock shaft is provided with an upwardly extending rock arm $o^5$ which latter is connected with the sliding plate by a link P. This link is pivoted at its rear end to lugs $p$ formed on the upper side of the sliding plate and its opposite end is pivotally secured to the rock arm $o^5$ by a bolt $p'$. The latter preferably passes through a slot $p^2$ in the rock arm to permit of adjusting the movement of the sliding plate.

Q represents a depending elbow lever whereby the horizontal rock shaft is actuated. This elbow lever consists of a vertical portion $q$ secured with its upper end to the rock shaft O and a horizontal portion $q'$ extending inwardly from the lower end of the vertical portion.

$q^2$ represents a coil spring attached with its opposite ends to the lower portion of the main frame and the lower end of the elbow lever. This spring is constantly under tension and tends to move the elbow lever outwardly thereby moving the saw inwardly toward the heading through the medium of the intermediate connecting mechanism.

R represents a horizontal rock or retracting arm secured at one end to the vertical rock shaft D and provided at its opposite end with a nose $r$. The latter bears against the outer side of the elbow lever, thereby moving the horizontal rock shaft and the saw in a direction opposite to that in which they are moved by the spring $q^2$. When the clamp frame moves forward, the horizontal rock arm R moves outwardly, thereby permitting the spring $q^2$ to move the saw inwardly. Upon returning the clamp frame the nose of the horizontal rock arm strikes the elbow lever, thereby moving the saw outwardly.

S represents a trip pawl whereby the forward movement of the saw is arrested until the revolving clamping disks carrying the heading have almost completed their forward movement. The trip pawl is secured to one end of a horizontal trip shaft $s$ journaled in bearings $s', s^2$ formed in the brackets $o^3 o^4$. The free end of the pawl engages with a ratchet wheel $s^3$ secured to the adjacent end of the rock shaft O. The trip pawl is yieldingly held in contact with the ratchet wheel by a flat spring $s^3$ secured with one end to the table and bearing with its opposite end upon the pawl.

T represents a depending trip arm whereby the trip pawl is disengaged from the ratchet wheel. This trip arm is secured with its upper end to the trip shaft and is provided at its lower end with an inwardly extending toe $t$ against which the outer side of the horizontal rock arm R is adapted to bear.

The operation of turning heading is as follows:—After placing the required number of heading boards between the clamping disks, the treadle H is depressed which causes the clamp frame to move forward and firmly clamp the boards by the straightening of the toggle. Upon continuing the forward movement of the clamp frame the driving belt is tightened sufficiently to cause the clamping disks and the heading to revolve. The final forward movement of the clamp frame brings the revolving heading boards close to the edge of the saw. During the first part of the forward movement of the clamp frame the trip pawl is in engagement with the ratchet wheel and the horizontal rock arm moves outwardly so as to remove its nose from the outer side of the elbow lever, thereby permitting the latter to be drawn downwardly and the saw to be moved inwardly by the spring $q^2$ until the lost motion between the free end of the trip pawl and the next following tooth of the ratchet wheel is taken up, when the forward movement of the saw is arrested in a position in which the saw is almost in contact with the revolving heading boards. During the final portion of the forward movement of the clamp frame the horizontal rock arm R strikes the toe of the depending trip arm T, thereby raising the trip pawl and releasing the ratchet wheel. This permits the spring $q^2$ to draw the elbow lever downwardly and move the saw quickly across the path of the revolving heading boards until the sliding plate strikes the stop $n$. When the clamping disks have made a little more than one revolution the turning of the heading is completed and the clamp frame is released and moved backward. During the backward movement of the clamp frame the rotation of the heading is arrested by the slackening of the driving belt and the heading is released by the separation of the clamping disks and drops into a chute $u$ underneath the disks. During the final backward movement of the clamp frame the nose of the horizontal rock arm strikes the elbow lever and moves the saw outwardly and at the same time releases the trip arm so as to permit the pawl to engage with the ratchet wheel and retain the saw in its retracted position.

Only one of the teeth on the ratchet wheel is in use during the operation of the machine, but a wheel having ratchet teeth entirely around its periphery is preferably employed, as represented in the drawings, so that a new tooth can be presented to the pawl by turning the wheel when a tooth which has been in use has become worn.

By moving the saw across the path of the revolving heading boards in a straight line parallel with the axis of the heading, the edge of the head to be turned is perfectly square or parallel with the axis, as represented at $v$ in Fig. 6, which is very desirable for covers or bottoms for cheese boxes and similar articles.

In turning bottoms for pails and butter tubs in which an annular rabbet $v'$ is cut in the edge, a separate cutting tool V is secured to the arbor in front of the saw, as represented in Fig. 6. The cutting edge of this tool may be shaped to form a bevel $w$, if desired, on the edge of the heading, as represented in Fig. 7. The mechanism for moving the saw toward and from the heading and the tripping device permits the saw to pass quickly through the revolving heading, which avoids the necessity of making more than one revolution of the heading in order to effect a complete circular cut.

I claim as my invention—

1. The combination with the movable heading clamp and the saw and its carriage, of an actuating device tending to move the saw carriage forwardly, a stop mechanism whereby the forward movement of the saw carriage is arrested before the saw has reached the cutting position and a trip device whereby the saw carriage is released when the heading blank has reached the cutting position, substantially as set forth.

2. The combination with the heading clamp and the saw, both capable of movement toward and from the cutting position, of mechanism connecting the heading clamp with the saw carriage and retracting the saw carriage by the backward movement of the clamp, an actuating device which tends to move the saw carriage to the cutting position, a stop mechanism whereby the forward movement of the saw carriage is arrested before it reaches the cutting position and a trip mechanism whereby the saw carriage is released and permitted to be moved forwardly when the clamp has moved the blank to the cutting position, substantially as set forth.

3. The combination with the main frame, the clamp frame pivoted on the main frame and the revolving heading clamp journaled on the clamp frame, of a saw having its axis arranged obliquely with reference to the axis of the heading clamp, a sliding plate having a movement parallel with the axis of the heading clamp and adapted to carry the saw across the path of the heading blank, a rock shaft having an upper and a lower rock arm, a link connecting the upper rock arm with the sliding plate, a spring connected with the lower rock arm and adapted to move the saw into its operative position, and a retracting arm mounted on the clamp frame and adapted to engage with the lower rock arm for moving the saw into its inoperative position, substantially as set forth.

4. The combination with the clamp frame, the heading clamp mounted on said frame and the saw having a movement toward and from the heading clamp, of a spring whereby the saw is moved forward, a pawl whereby the forward movement of the saw is arrested and a trip arm connected with the clamp frame and adapted to release the saw from the pawl, substantially as set forth.

5. The combination with the main frame, the clamp frame movably arranged in said main frame and the heading clamp mounted in said clamp frame of a sliding plate guided upon the main frame, and having a movement toward and from said clamp, a saw mounted upon said sliding plate, a ratchet connected with said sliding plate, a pawl engaging with said ratchet, and an arm attached to the clamp frame and engaging with said pawl, whereby the latter is released from said ratchet, substantially as set forth.

6. The combination with the main frame, the vertical rock shaft journaled in said frame, the clamp frame supported on said vertical shaft and the heading clamp arranged upon the clamp frame, of a sliding plate guided upon the main frame and having a movement toward and from the heading frame, a concave saw mounted on said sliding plate, a horizontal rock shaft journaled in the main frame and connected with the sliding plate, a rachet wheel and a depending elbow lever secured to said horizontal rock shaft, a spring connecting said elbow lever with the main frame, a pawl engaging with said rachet wheel and provided with a trip arm, and a rock arm secured to the vertical rock shaft and engaging with the elbow lever and trip arm, substantially as set forth.

Witness my hand this 10th day of November, 1891.

WILLIAM W. TREVOR.

Witnesses:
J. CARSON SHELDON,
JOHN W. WARD.